United States Patent
Shimosato

(10) Patent No.: US 8,619,327 B2
(45) Date of Patent: Dec. 31, 2013

(54) IMAGE DATA COLOR CONVERSION TECHNIQUE USING THRESHOLD WITH REDUCED PIXELS FUNCTION AND IMAGE PROCESSING APPARATUS

(75) Inventor: Hiroaki Shimosato, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 106 days.

(21) Appl. No.: 13/421,716

(22) Filed: Mar. 15, 2012

(65) Prior Publication Data

US 2012/0236337 A1    Sep. 20, 2012

(30) Foreign Application Priority Data

Mar. 16, 2011    (JP) .................................. 2011-057855

(51) Int. Cl.
*G06K 15/00*    (2006.01)
*G03F 3/08*    (2006.01)

(52) U.S. Cl.
USPC .......... 358/1.9; 358/3.01; 358/3.02; 358/3.23; 358/518

(58) Field of Classification Search
None
See application file for complete search history.

(56) References Cited

U.S. PATENT DOCUMENTS

2009/0080003 A1*    3/2009    Murakami ..................... 358/1.9

FOREIGN PATENT DOCUMENTS

JP    2002-016815 A    1/2002

* cited by examiner

*Primary Examiner* — Fan Zhang
*Assistant Examiner* — Haris Sabah
(74) *Attorney, Agent, or Firm* — Maschoff Brennan

(57) ABSTRACT

An image processing apparatus which converts first image data having grayscale value of a predetermined color space for each pixel into second image data having grayscale values of recording material colors of a printing section and having pixels of which the number is reduced to 1/n, includes grayscale value difference determination section that determines whether or not grayscale value difference between a predetermined target pixel and each of other pixels in a pixel block exceeds a threshold value for each of the pixel blocks for the first image data, and color conversion section that performs color conversion process by referring to color conversion table, and color conversion section performs a second process such that grayscale value of the recording material color obtained through color conversion process for an average value of grayscale values of the predetermined color space of the respective pixels is used as the second image data.

5 Claims, 5 Drawing Sheets

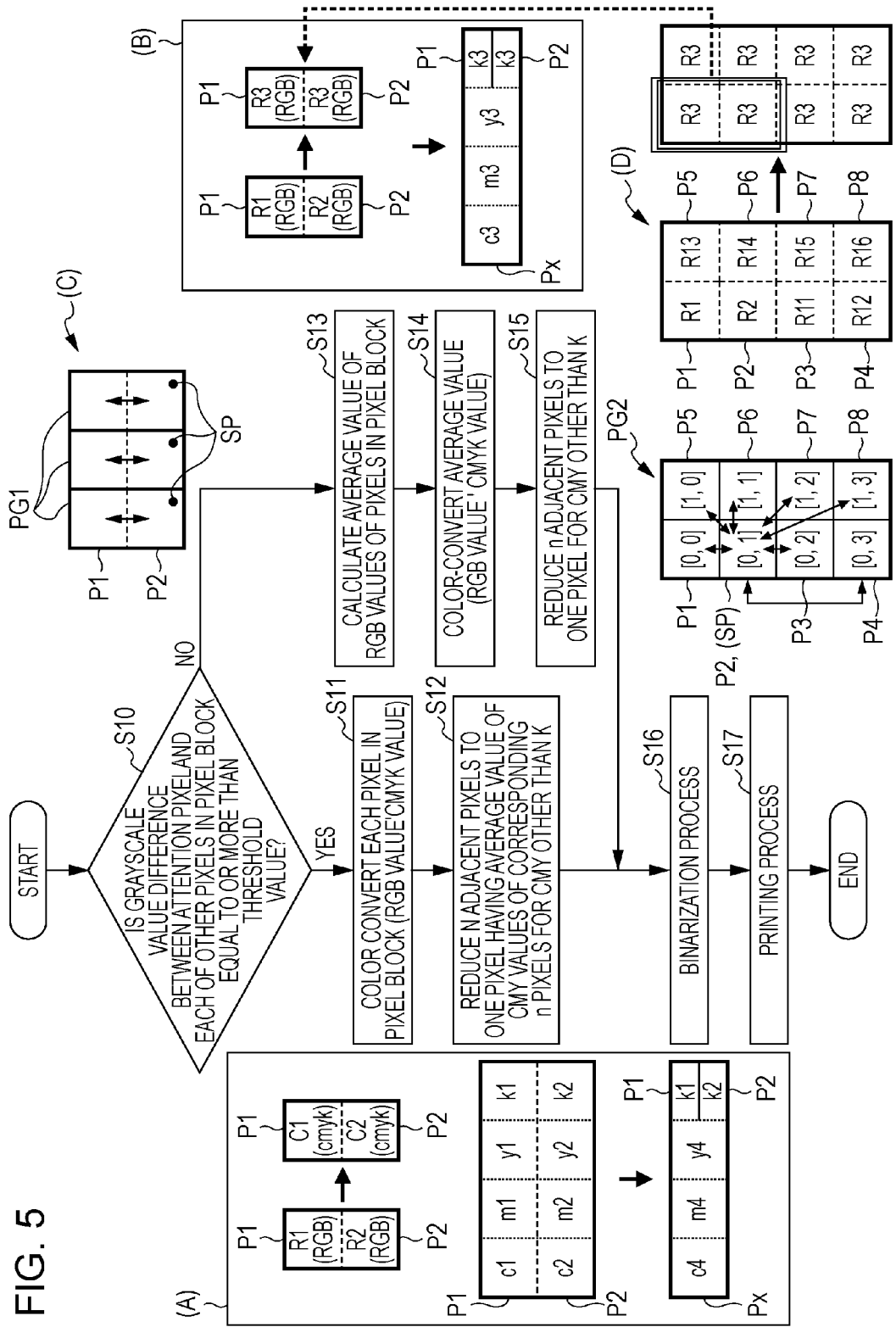

IMAGE DATA COLOR CONVERSION TECHNIQUE USING THRESHOLD WITH REDUCED PIXELS FUNCTION AND IMAGE PROCESSING APPARATUS

BACKGROUND

1. Technical Field

The present invention relates to an image processing apparatus.

2. Related Art

There are cases where an image processing apparatus color-converts image data having a grayscale value of RGB (RGB value) into image data having a grayscale value of CMYK (CMYK value) which are toner (ink) colors of a printing device for each pixel when image data is printed, and reduces the image data so as to be suitable for a printing resolution or the like.

For example, in a case where the number of pixels of the image data is reduced to ½ in the longitudinal direction, the image processing apparatus reduces two pixels adjacent in the longitudinal direction to one pixel which has a CMYK value obtained by color-converting an average value of the RGB values of the two pixels. Thereby, the image processing apparatus reduces the number of referring to a color conversion table to ½ in a case of performing a color conversion process for each pixel, and performs the image process at high speed.

However, generally, in the color conversion table, the CMYK value is not necessarily proportional to a change in the RGB value and is changed so as to draw a curve. Specifically, if a K value (black) is used as an example, in relation to a change from white (RGB=255, 255, 255) of the RGB value to black (RGB=0, 0, 0), the K value is changed so as to slightly increase from white to an intermediate color of white and black and to greatly increase around black.

In a case of being based on such a color conversion table, a CMYK value corresponding to an average value of two RGB values and an average value of CMYK values respectively corresponding to two RGB values represent different colors. For this reason, as described above, if the color conversion process is performed based on the RGB average value of the two adjacent pixels, the conversion is performed to a CMYK value which is different from an average value of CMYK values respectively corresponding to RGB values of two pixels, and this causes deterioration in image quality.

In addition, for example, JP-A-2002-16815 discloses an image processing apparatus which performs the color conversion process before and after enlargement and reduction of image data.

Therefore, the image processing apparatus acquires a CMYK value by performing the color conversion process for each pixel of image data having an RGB value, and then generates image data of a CMYK value which is reduced to ½ in the longitudinal direction by using an average value of CMYK values of two pixels in the longitudinal direction as a CMYK value of one pixel. Thereby, deterioration in image quality is prevented. On the other hand, however, there is a problem in that, since the color conversion process is performed for each pixel of image data, color conversion processes corresponding to at least the number of pixels are performed, and thus a process speed is low.

SUMMARY

An advantage of some aspects of the invention is to provide an image processing apparatus where a process speed is high without image quality deteriorating in an image process for color-converting and reducing image data.

According to an aspect of the invention, there is provided an image processing apparatus which converts first image data having a grayscale value of a predetermined color space for each pixel into second image data having grayscale values of recording material colors of a printing section and having pixels of which the number is reduced to 1/n, includes a grayscale value difference determination section that determines whether or not a grayscale value difference between a predetermined target pixel and each of other pixels in a pixel block exceeds a threshold value for each of the pixel blocks having a plurality of adjacent pixels for the first image data; and a color conversion section that performs a color conversion process where the grayscale value of the predetermined color space of the pixel is converted into the grayscale value of the recording material color by referring to a color conversion table, wherein, if the grayscale value difference exceeds the threshold value, the color conversion section performs a first process for the first image data such that the color conversion process is performed for each of the pixels in the pixel block, and then an average value of grayscale values of the recording material colors after the color conversion process for n pixels which are adjacent to each other is used as the second image data, and wherein, if the grayscale value difference does not exceed the threshold value, the color conversion section performs a second process for the first image data such that a grayscale value of the recording material color obtained through the color conversion process for an average value of the grayscale values of the predetermined color space of the respective pixels in the pixel block is used as the second image data.

According to the aspect, in an image process where image data having a grayscale value of a predetermined color space is converted into image data having grayscale values of recording material colors and having pixels of which the number is reduced to 1/n, the image processing apparatus can increase a process speed and prevent image quality deterioration.

If the grayscale value difference exceeds the threshold value, the color conversion section may perform the first process for at least one of the recording material colors, and may not reduce the number of the pixels to 1/n and use grayscale values of the recording material colors after the color conversion process as grayscale values of the respective n pixels for the other colors, and, if the grayscale value difference does not exceed the threshold value, the color conversion section may perform the second process for at least one color, and may not reduce the number of the pixels to 1/n and use grayscale values of the recording material colors after the color conversion process as grayscale values of the respective n pixels for the other colors.

According to the aspect, in an image process where image data having a grayscale value of a predetermined color space is converted into image data having grayscale values of recording material colors and having pixels of which the number is reduced to 1/n for at least one color, the image processing apparatus can increase a process speed and prevent image quality deterioration other than the corresponding one color.

The recording materials may include at least black, and at least one color may be a color other than the black.

According to the aspect, in an image process where image data having a grayscale value of a predetermined color space is converted into image data having grayscale values of recording material colors and having pixels of which the number is reduced to 1/n, the image processing apparatus can increase a process speed and prevent image quality deterioration of black.

The recording materials may include at least black, and at least one color may be a color other than the black.

According to the aspect, in an image process where image data having a grayscale value of a predetermined color space is converted into image data having grayscale values of recording material colors and having pixels of which the number is reduced to 1/n, the image processing apparatus can increase a process speed and prevent image quality deterioration of black.

The number of the plurality of pixels included in the pixel block may be larger than n.

According to the aspect, the image processing apparatus can further reduce the number of color conversion processes for the pixel block than the number of pixels in the reduced pixel block.

The grayscale value difference determination section may determine that the grayscale value difference exceeds the threshold value if a grayscale value difference of at least one component of components of the predetermined color space exceeds the threshold value.

According to the aspect, a grayscale value difference in the pixel block can be determined depending on whether or not a grayscale value difference of at least one component of the components of the predetermined color space exceeds the threshold value.

BRIEF DESCRIPTION OF THE DRAWINGS

The invention will be described with reference to the accompanying drawings, wherein like numbers reference like elements.

FIG. 5 is a flowchart illustrating an image process according to the embodiment.

DESCRIPTION OF EXEMPLARY EMBODIMENTS

First Embodiment

Hereinafter, embodiments of the invention will be described with reference to the drawings. Here, the technical scope of the invention is not limited to the embodiments and covers the matters disclosed in the claims and the equivalents thereof.

Figure 1:
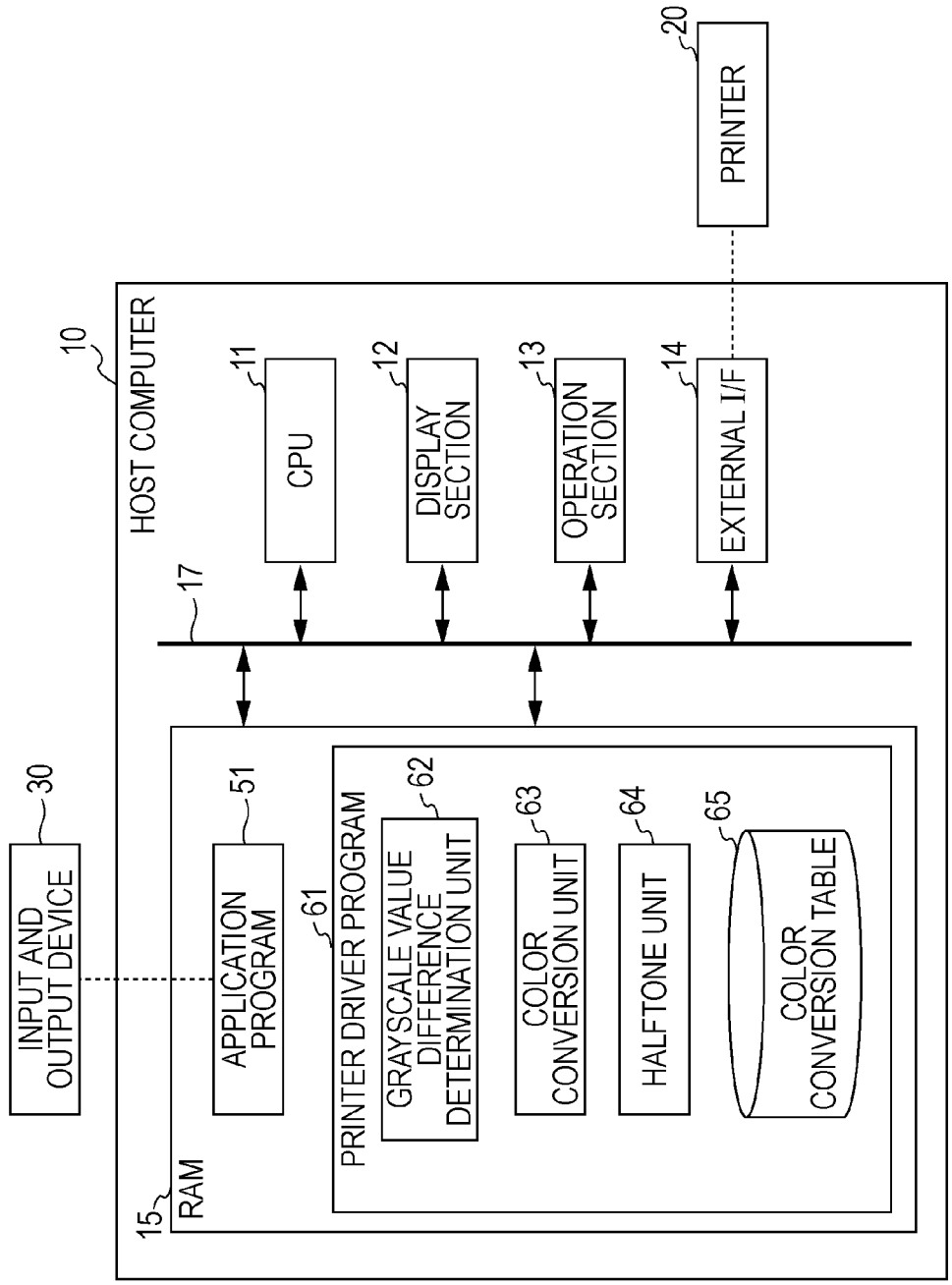
FIG. 1 is a diagram illustrating a configuration example of the image processing apparatus according to an embodiment.

FIG. 1 is an exemplary diagram illustrating a configuration of a host computer 10 which is an example of the image processing apparatus according to an embodiment. A CPU 11 of the host computer 10 executes a program stored in an internal memory such as a RAM (Random Access Memory) 15 and controls the host computer 10. An external interface (I/F) 14 inputs and outputs data or information to and from a printer 20 and peripheral devices (not shown) connected to the host computer 10 via, for example, a network. In addition the host computer 10 includes a display section 12 such as a display, an operation section 13 such as a keyboard or a mouse, and the like. A bus 17 connects the CPU 11, the RAM 15, the display section 12, the operation section 13, and the external interface 14, and enables data to be transmitted and received therebetween.

The host computer 10 having the configuration stores an application program 51, and a printer driver program 61 for enabling the printer 20 to print image data, in the RAM 15. The printer driver program 61 and the application program 51 respectively function as the printer driver 61 and the application 51 through cooperation with hardware including the CPU 11 of the host computer 10. The printer driver program 61 includes, for example, a grayscale value difference determination unit 62, a color conversion unit 63, a halftone unit 64, and a color conversion table 65.

Specifically, the grayscale value difference determination unit 62 of the printer driver program 61 acquires differences in RGB values between pixels, and determines whether or not a difference exceeds a threshold value in any color of RGB. In addition, the color conversion unit 63 of the printer driver program 61 converts image data having RGB values of 256 grayscales into image data having CMYK values of 256 grayscales which are toner (ink) colors of the printer 20 based on the color conversion table 65. The color conversion unit 63 according to the embodiment performs a color conversion process and reduces image data to image data of 1/n pixels. Details of the process will be described later.

The halftone unit 64 of the printer driver program performs the color conversion process as a halftone process, and converts image data of reduced CMYK values into image data indicating whether or not to form a dot of each color of, for example, CMYK for each pixel based on a grayscale value of each pixel.

In FIG. 1, for example, image data is input to the application program (hereinafter, referred to as an "application") 51 from an input and output device 30 such as a digital camera, and performs a printing instruction on the application. In addition, the printer driver program (hereinafter, referred to as a "printer driver") 61 according to the embodiment converts image data having RGB values of 256 grayscales into image data (for example, binary image data of CMYK) which has the number of 1/n pixels and has a format which can be printed by the printer 20, by the process of each unit shown in FIG. 1. Next, the printer driver 61 performs a printing process by outputting the converted image data to the printer 20 via the external interface 14.

However, in the image process of the printer driver 61, it takes time for the color conversion unit 63 to perform the color conversion process. This is because the color conversion unit 63 sequentially refers to the color conversion table 65 stored in a memory such as the RAM and acquires CMYK values based on RGB values of image data. For this reason, it is preferable that the number of the color conversion processes be suppressed to as small a number as possible in order to increase an image processing speed.

Therefore, in a case where image data having RGB grayscale values is converted into image data of half of the number of pixels having CMYK grayscale values, the printer driver 61 reduces adjacent two pixels to one pixel which has a CMYK value obtained by color-converting an average value of RGB values of the two pixels. Thereby, as compared with a case where the color conversion process is performed for each of the two pixels, the number of the color conversion processes is reduced to ½, and time for the image process is suppressed.

However, if a CMYK value is acquired through the color conversion process based on an average value of RGB values of two pixels, the CMYK value and an average value of CMYK values obtained by respectively color-converting RGB values of two pixels represent different colors due to characteristics of the color conversion table 65 which is referred to in the color conversion process. For this reason, if image data is reduced by reducing adjacent two pixels to one pixel which has a CMYK value obtained by color-converting an average value of RGB values of the two pixels, there are cases where image quality of the reduced image data deteriorates.

Here, a color difference between a CMYK value obtained by color-converting an average value of RGB values of two pixels and an average value of CMYK values obtained by respectively color-converting the RGB values of the two pixels will be described based on a detailed example.

Figure 2:
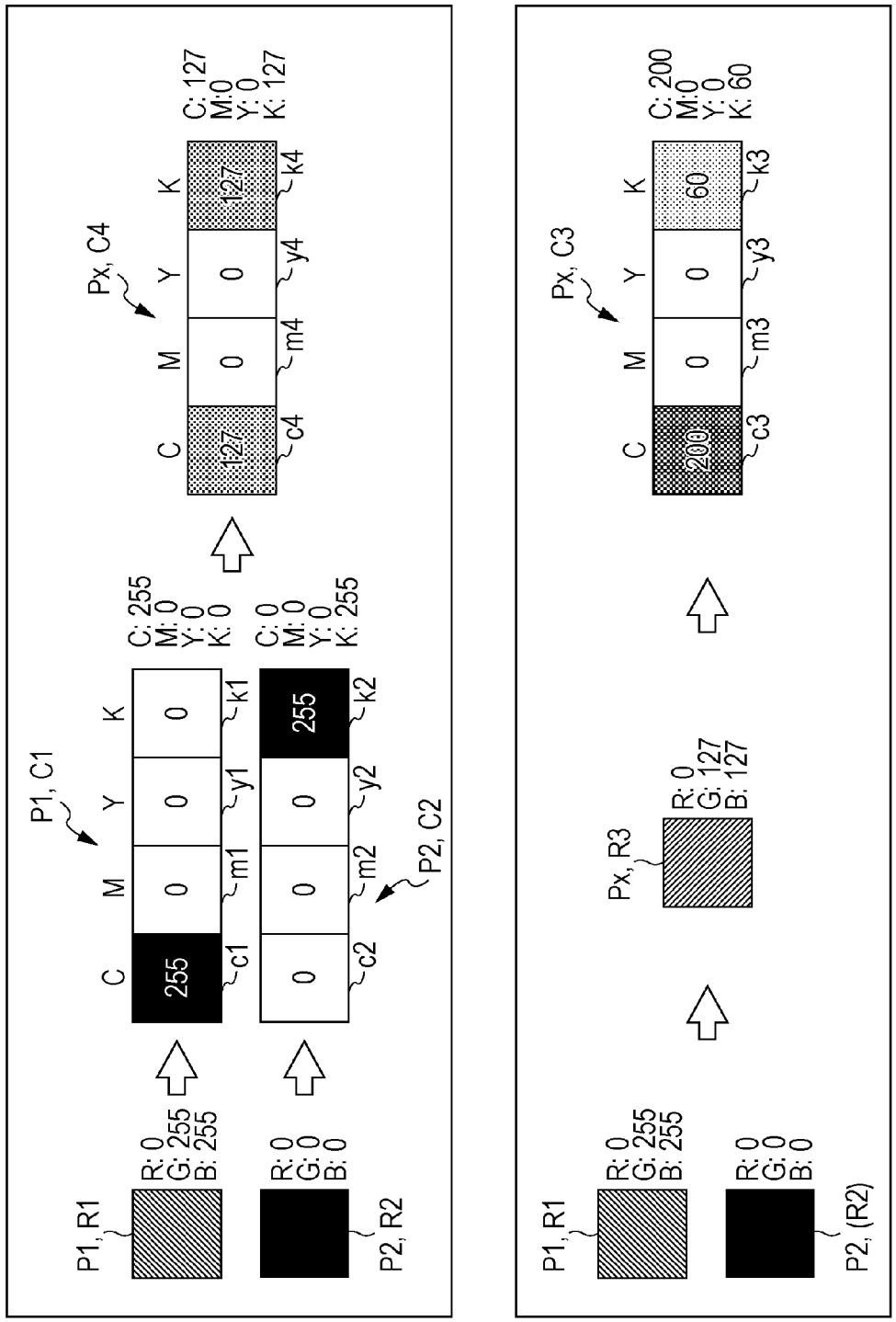
FIG. 2 is a diagram illustrating a first detailed example of the difference between an average value of CMYK values obtained by color-converting the respective RGB values and an average value of a CMYK value obtained by color-converting an average value of the respective RGB values.

FIG. 2 is a diagram illustrating a first detailed example of the difference between an average value C4 (upper part of the figure) of CMYK values C1 and C2 obtained by color-converting two RGB values R1 and R2 and a CMYK value C3 (lower part of the figure) obtained by color-converting an average value R3 of the two RGB values. In the same figure, the first detailed example is an example where a pixel P1' having an RGB value R1 (R, G, B)=(0, 255, 255) indicating cyan and a pixel P2 having an RGB value R2 (R, G, B)=(0, 0, 0) indicating black is reduced to a pixel Px having an average CMYK value.

First, there will be made of a description of a case where an average value C4 of CMYK values C1 and C2 obtained by respectively color-converting the RGB values R1 and R2 is used as a CMYK value of the pixel Px. The RGB value R1 indicating cyan is converted into a CMYK value C1 (c1, m1, y1, k1)=(255, 0, 0, 0) which has, for example, a grayscale value 255 for C (cyan) c1 and a grayscale value 0 for the other components (m1, k1, y1) as a result of the color conversion process. In addition, the RGB value R2 indicating black is converted into a CMYK value C2 (c2, m2, y2, k2)=(0, 0, 0, 255) which has, for example, a grayscale value 255 for K (black) k2 and a grayscale value 0 for the other components (c2, m2, y2) as a result of the color conversion process.

In addition, the average value C4 (c4, m4, y4, k4)=(127, 0, 0, 127) of the color-converted CMYK values C1 and C2 has a grayscale value 127 (=255/2) for C (cyan) c4 and K (black) k4 and a grayscale value 0 for the other colors (m4, y4). In this way, the CMYK value C4 has the grayscale values of the cyan component in the RGB value R1 and the black component in the RGB value R2 at the same ratio.

Second, there will be made a description of a case where a CMYK value C3 obtained by color-converting an average value R3 of the RGB values R1 and R2 is used as a CMYK value of the pixel Px. The average value of the RGB values R1 and R2 is the RGB value R3 (R, G, B)=(0, 127, 127). In addition, the RGB value R3 is converted into the CMYK value C3 (c3, m3, y3, k3)=(200, 0, 0, 60) which has a grayscale value 200 for C (cyan) c3 and a grayscale value 60 for K (black) k3 as a result of the color conversion process. The CMYK value C3 has the cyan component in the RGB value R1 and the black component in the RGB value R2 in the same manner as the CMYK value C4, but has the higher C (cyan) grayscale and the lower K (black) grayscale value than the CMYK value C4. In other words, the CMYK value C3 has the stronger cyan component than the CMYK value C4, and has a tinge different from the CMYK value C4.

As described above, the average value C4 of the CMYK values C1 and C2 obtained by respectively color-converting the RGB values R1 and R2 and the CMYK value C3 obtained by color-converting the average value R3 of the RGB values R1 and R2 represent different colors. This results from characteristics of the color conversion table which is referred to in the color conversion process. Next, the color conversion process will be described.

Figure 3:
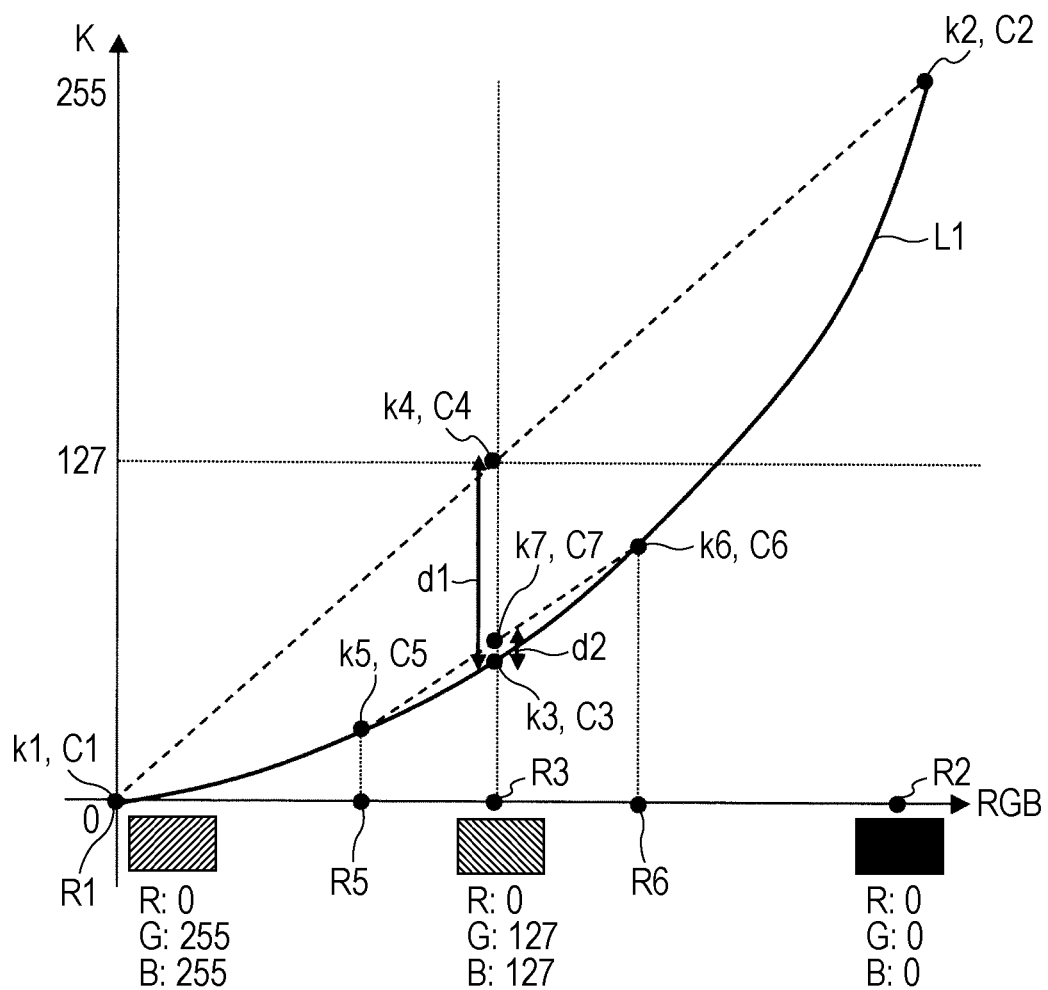
FIG. 3 is a diagram illustrating an example of the color conversion table according to the embodiment.

FIG. 3 is a diagram illustrating an example of the color conversion table (the reference numeral 65 in FIG. 1) which is referred to in the color conversion process according to the embodiment. In the same figure, the transverse axis represents a color transition of the RGB value from the RGB value R1 indicating cyan to the RGB value R2 indicating black, and the longitudinal axis represents a grayscale value of the K value in the CMYK value corresponding to the RGB value. In addition, in the same figure, the curve L1 indicates a transition of the grayscale value of the K value in the CMYK value corresponding to a color transition from the RGB value R1 to the RGB value R2 in the color conversion table according to the embodiment. In the same figure, the RGB values R1 to R3 in the transverse axis indicate the same colors as in FIG. 2, and the K values k1 to k4 in the longitudinal axis indicate the K values in the CMYK values C1 to C4 in FIG. 2.

As shown in FIG. 3, the K (black) values in the CMYK values corresponding to the respective RGB values transition so as to draw not a straight line but a curve relative to a transition from the RGB value R1 to the RGB value R2 in the transverse axis. For this reason, in the curve L1 in the same figure, the increasing rate of the K grayscale value is low up to the vicinity of the intermediate color of the RGB value R1 and the RGB value R2, and the increasing rate of the K grayscale value is high around the RGB value R2.

Therefore, if the color conversion process is performed based on the color conversion table shown in FIG. 3, the K grayscale value k3 of the CMYK value C3 corresponding to the average value R3 of the two RGB values R1 and R2 and the K grayscale value k4 of the average value C4 of the CMYK values C1 and C2 obtained by color-converting the two RGB values R1 and R2 have different values. Generally, the grayscale values of the colors other than K transition so as to draw a curve in the color conversion table, and thus the CMYK value C3 and the CMYK value C4 represent different colors.

Next, a color difference between a CMYK value obtained by color-converting an average value of RGB values of two pixels and an average value of CMYK values obtained by respectively color-converting the RGB values of the two pixels will be described using another detailed example.

Figure 4:
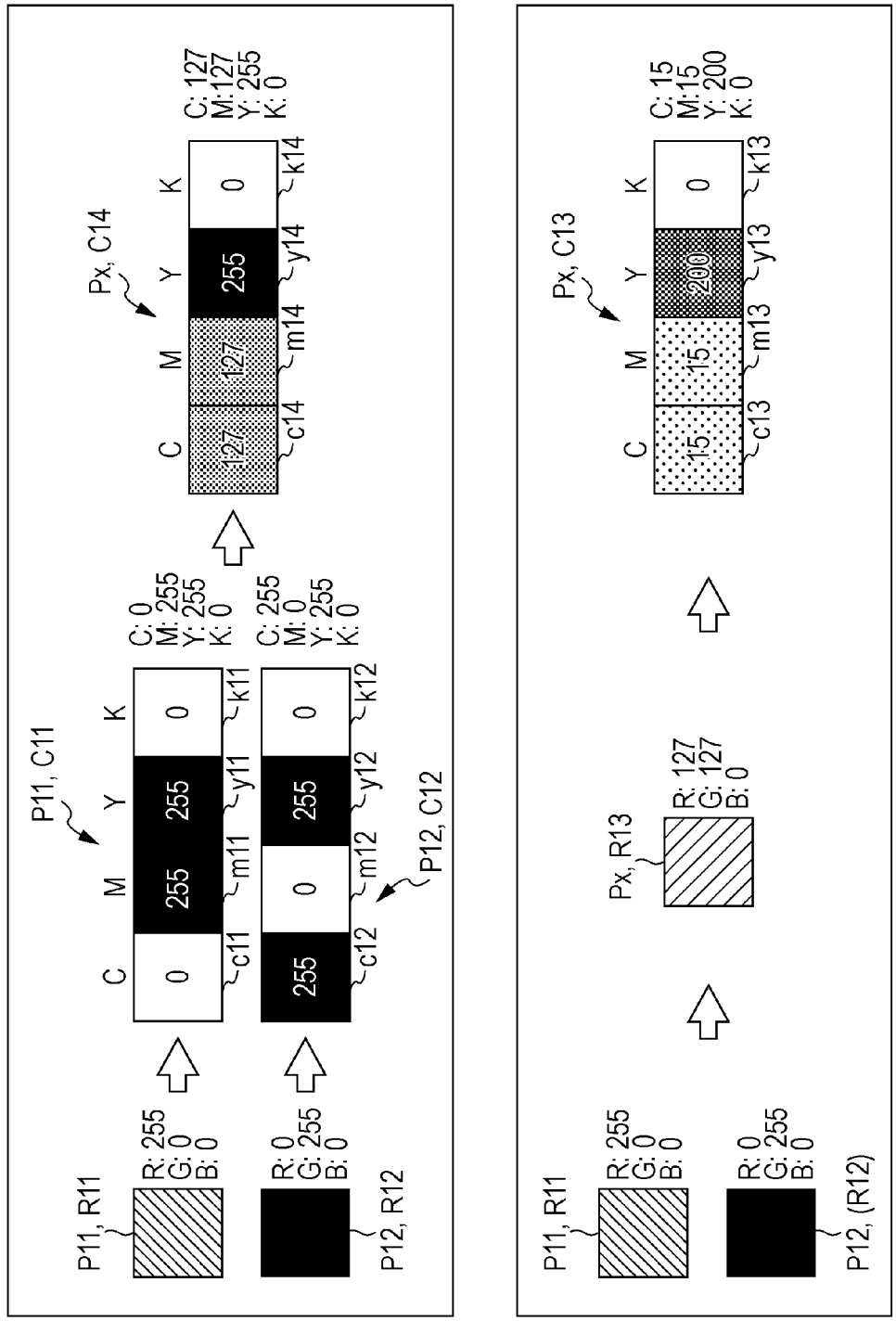
FIG. 4 is a diagram illustrating a second detailed example of the difference between CMYK values related to FIG. 2.

FIG. 4 is a diagram illustrating a second detailed example of the difference between an average value C14 of CMYK values C11 and C12 obtained by respectively color-converting two RGB values R11 and R12 and a CMYK value C13 obtained by color-converting an average value R13 of the two RGB values. In the same figure, the second detailed example is an example where a pixel P11 having R11 (R, G, B)=(255, 0, 0) indicating red and a pixel P12 having R12 (R, G, B)=(0, 255, 0) indicating green are reduced to one pixel Px having an average CMYK value.

First, there will be made of a description of a case where an average value C14 of CMYK values C11 and C12 obtained by respectively color-converting the RGB values R11 and R12 is used as a CMYK value of the pixel Px. For example, the RGB value R11 indicating red is converted into a CMYK value C11 (c11, m11, y11, k11)=(0, 255, 255, 0) which has a grayscale value 255 for M (magenta) m11 and Y (yellow) y11 and a grayscale value 0 for the other components (c11, k11) as a result of the color conversion process. In addition, the RGB value R12 indicating green is converted into a CMYK value C12 (c12, m12, y12, k12)=(255, 0, 255, 0) which has a grayscale value 255 for C (cyan) c12 and Y (yellow) y12 and a grayscale value 0 for the other components (m12, k12) as a result of the color conversion process.

In addition, the average value C14 (c14, m14, y14, k14)= (127, 127, 255, 0) of the color-converted CMYK values C11 and C12 has a grayscale value 127 (=255/2) for C (cyan) c14 and M (magenta) m14 and a grayscale value 255 (=510/2) for Y (yellow) y14.

Second, there will be made a description of a case where a CMYK value C13 obtained by color-converting an average value R13 of the RGB values R11 and R12 is used as a CMYK value of the pixel Px. The average value of the RGB values R11 and R12 is the RGB value R13 (R, G, B)=(127, 127, 0). In addition, the RGB value R13 is converted into the CMYK value C13 (c13, m13, y13, k13)=(15, 15, 200, 0) which has a grayscale value 15 for C (cyan) c13 and M (magenta) m13 and a grayscale value 200 for Y (yellow) y13.

As a result, the CMYK value C13 has the same color components as the CMYK value C14 but has different grayscale values from the CMYK value C14, and thus has a tinge different from the CMYK value C14. As described above, in the same manner as another detailed example RGB values R11 and R12, the average value of the CMYK values obtained by respectively color-converting the two RGB values and the CMYK value obtained by color-converting the average value of the two RGB values represent different colors.

Such a difference in the CMYK values is notably shown as a grayscale value difference between two targeted RGB values become larger. For example, referring to FIG. 3 again, two RGB values R5 and R6 having a grayscale value difference smaller than that between the RGB values R1 and R2 are used an example. In addition, an average value of the RGB values R5 and R6 is the RGB value R3.

As shown in FIG. 3, in the same manner as the RGB values R1 and R2, a K grayscale value k7 of an average value C7 of the CMYK values C5 and C6 obtained by respectively color-converting the RGB values R5 and R6 and a K grayscale value k3 of the CMYK value C3 obtained by color-converting the average RGB value R3 have different values. However, a color difference amount d2 between the K grayscale value k7 and a K grayscale value k3 is smaller than a color difference amount d1 between the K grayscale value k4 of the average value C4 of the CMYK values C1 and C2 corresponding to the RGB values R1 and R2 having the larger grayscale value difference and the K grayscale value k3. In other words, as the grayscale value difference between two RGB values becomes larger, a color difference between a CMYK value corresponding to an average RGB value and an average value of CMYK values corresponding to the RGB values tends to increase.

As above, a CMYK value obtained by color-converting an average value of two RGB values has a color different from a color of an average value of CMYK values obtained by respectively color-converting the RGB values. For this reason, in a case where image data having RGB grayscale values is converted into image data of 1/n of the number of pixels having CMYK grayscale value, if adjacent n pixels are reduced to one pixel having a CMYK value obtained by color-converting an average value of RGB values of the n pixels, the number of color conversion processes is reduced to 1/n and a process speed increases, but image data deteriorates. For example, in a case where the image process is performed for image data having a thin line of a dark color such as black, there is an occurrence of a phenomenon where the thin line disappears or is difficult to read in a printing image of the image data. On the other hand, if adjacent n pixels are reduced to one pixel having an average value of CMYK values obtained by respectively color-converting RGB values of the n pixels, image quality is maintained, but color conversion processes corresponding to the number of pixels are performed and thus the process speed is low.

Therefore, the image processing apparatus according to the embodiment includes a grayscale value difference determination section which determines whether or not a difference in grayscale values of a predetermined color space of a predetermined target pixel and each of the other pixels in a pixel block for each pixel block exceeds a threshold value, and a color conversion section which color-converts a grayscale value of a predetermined color space of a pixel into a grayscale value of a recording material color of a printing section based on the color conversion table. In addition, if the grayscale value difference exceeds the threshold value, the color conversion section performs the color conversion process for each pixel in the pixel block and then reduces adjacent n pixels to one pixel having a grayscale value of a recording material color obtained through the color conversion process for the n pixels. On the other hand, if the grayscale value difference does not exceed the threshold value, the color conversion section reduces the adjacent n pixels to one pixel having a grayscale value of a recording material color, obtained through the color conversion process for an average value of grayscale values of the predetermined color space of the respective pixels in the pixel block including the n pixels.

Next, processes performed by the image processing apparatus according to the embodiment will be described with reference to the flowchart. In addition, in the embodiment, it is assumed that components of a predetermined color space are RGB, and recording material colors of the printing section are CMYK (cyan, magenta, yellow, and black). However, the invention is not limited to this example, the predetermined color space and the recording material colors may be other color systems.

FIG. 5 is a flowchart illustrating processes performed by the image processing apparatus according to the embodiment. In the flowchart, the image processing apparatus reduces image data of each of CMY other than K of the toner (ink) colors CMYK of the printer 20 which is a printing section to image data of half of the number of pixels in the longitudinal direction. Thereby, image data where only K has a resolution two times higher than CMY is generated. Such image data is printed by, for example, the ink jet printer 20 which has a printing head where a K nozzle density is two times higher than a CMY nozzle density.

When printing is instructed on the application (the reference numeral 51 in FIG. 1), the printer driver 61 performs the following processes for the image data having RGB grayscale values. The printer driver 61 determines whether or not a difference in grayscale values of a target pixel and other pixels in a pixel block with the units of the pixel block is equal to or more than a threshold value in relation to the image data (S10).

The pixel block PG1, as shown in the upper part C of FIG. 5, is a pixel group including a plurality of pixels (two pixels in the embodiment), and each pixel of the image data is included in one of pixel blocks PG1. In addition, the pixel block PG1 has a fixed target pixel SP. In the pixel block PG1 having pixels P1 and P2, the lower pixel P2 is assumed as the target pixel SP. Specifically, for example, the printer driver 61 obtains a grayscale value difference in RGB values between the pixel P2 which is the target pixel SP and the other pixel P1, and determines whether or not the grayscale value difference exceeds a threshold value 25 in any one of RGB.

In addition, although the threshold value is 25 in this example, the invention is not limited to this example. The threshold value is preferably adjusted and set depending on necessary image quality and process speed. In addition, the printer driver 61 may perform the determination in step S10, for example, based on whether or not a sum of grayscale value differences of RGB exceeds the threshold value.

If the grayscale value difference of any one of RGB exceeds the threshold value (YES in step S10), the printer driver 61 performs the color conversion process for each of the pixels P1 and P2 in the pixel block PG1 (S11). For this reason, the printer driver 61, as shown in the left part A FIG. 5, acquires a CMYK value C1 corresponding to the RGB value R1 of the pixel P1 and a CMYK value C2 corresponding to the RGB value R2 of the pixel P2 through the color conversion process. Next, the printer driver 61 reduces 2 (n) pixels which are longitudinally adjacent to one pixel having an average value of the CMYK values of the two pixels for each color of CMY other than K, thereby reducing the image data so as to have a half of the number of pixels (1/n of the number of pixels) (S12).

In the left part A of FIG. 5, the CMYK value C1 of the pixel P1 of the two adjacent pixels is indicated by "c1, m1, y1, and k1", and CMYK value C2 of the pixel P2 is indicated by "c2, m2, y2, and k2". Specifically, the printer driver 61 reduces the two adjacent pixels P1 and P2 to one pixel Px having an average value "c4, m4, and y4" of CMY of the two pixels for CMY excluding K, as shown in the same figure. In addition, since K is not reduced, the pixels P1 and P2 respectively have K grayscale values k1 and k2 in the respective CMYK values obtained through the color conversion process.

On the other hand, if the grayscale value difference does not exceed the threshold value in any color (NO in step S10), the printer driver 61 calculates an average value R3 of the RGB values R1 and R2 of the pixels P1 and P2 in the pixel block PG1 (S13). In addition, the printer driver 61 color-converts the average RGB value R3 so as to acquire the CMYK value C3 (S14). Next, the printer driver 61 reduces 2 (n) pixels which are longitudinally adjacent in the pixel block to one pixel having grayscale values of the respective colors of the CMYK value C3 obtained by color-converting the average RGB value R3 of the pixel block for each color of CMY other than K, thereby reducing the image data so as to have a half of the number of pixels (1/n of the number of pixels) (S15).

Specifically, the printer driver 61, as shown in the right part B FIG. 5, reduces the two adjacent pixels P1 and P2 to one pixel Px having the respective colors c3, m3 and y3 of the CMYK value C3 obtained by color-converting the average RGB value R3 of the pixel block for CMY other than K. In addition, since K is not reduced, the pixels P1 and P2 of n pixels of K respectively have the K grayscale value k3 in the CMYK value C3.

After step S12 or step S15, the printer driver 61 performs a halftone process for image data of each color of CMYK, and generates image data indicating whether or not a dot of each color is formed for each pixel (S16). In addition, the printer driver 61 transmits the generated image data to the printer 20 via the external interface 14. The printer 20 receives the image data and performs a printing process (S17). Since the image data generated by the image processing apparatus according to the embodiment has a resolution reduced to a half (1/n) for each color of CMY, a speed related to the image process increases. However, a resolution for K is not reduced, and thus image quality of black characters thin lines, or the like is maintained in a printing image.

As described above, the image processing apparatus according to the embodiment uses a CMYK value obtained by color-converting an average RGB value of pixels in a pixel group as a CMYK value common to the pixel block, with respect to the pixel block having a small grayscale value difference. In addition, with respect to a color to be reduced, the image processing apparatus reduces n pixels which are adjacent to each other in the pixel block to one pixel having the corresponding color in the CMYK value common to the pixel block.

Therefore, as described above in FIG. 3, a color difference between a CMYK value based on the average RGB value of the pixels and an average value of CMYK values corresponding to RGB values of the pixels is small in the pixels having a small grayscale value difference. For this reason, if the grayscale value difference between the pixels in the pixel block is small, the image processing apparatus prioritizes a process speed and obtains a CMYK value common to the pixel block by color-converting the average RGB value of the pixels in the pixel block, thereby suppressing the number of the color conversion processes to one for the pixel block.

On the other hand, with respect to the pixel block having a large grayscale value difference, the image processing apparatus obtains a CMYK value by respectively color-converting RGB values of the respective pixels in the pixel block. In addition, for a color to be reduced, the image processing apparatus reduces n pixels which are adjacent to each other in the pixel block to one pixel having an average value of the corresponding color in the CMYK value of each pixel.

Therefore, as described above in FIG. 3, a color difference between a CMYK value based on the average RGB value of the pixels and an average value of CMYK values corresponding to RGB values of the pixels is large in the pixels having the large grayscale value difference. For this reason, if the grayscale value difference between the pixels in the pixel block is large, the image processing apparatus prioritizes image quality to a process speed, and performs the color conversion process for each pixel in the pixel block. For example, the pixel block having a large grayscale value difference refers to a pixel block partially having pixels for drawing thin lines.

As such, the image processing apparatus according to the embodiment changes between the methods of obtaining a CMYK value of each pixel in the pixel block depending on a grayscale value difference in RGB values of the pixels in the pixel block. Thereby, the image processing apparatus can improve a process speed and prevent image quality deterioration in an image process where image data having RGB values is converted into image data of 1/n of the number of the pixels having CMYK values.

In the image processing apparatus according to the embodiment, image data for colors (CMY in the embodiment) other than K (black) out of the recording material colors is reduced so as to have 1/n of the number of the pixels, thereby reducing the resolution, and the black image data is not reduced so as to maintain the resolution. Thereby, while maintaining image quality of black characters or thin lines, it is possible to prevent image quality deterioration and to improve a process speed in a conversion process for reducing image data to 1/n of the number of pixels for each color of CMY. However, the invention is not limited to this example.

If, for at least one color of the recording material colors, a grayscale value difference between the pixels in the pixel block exceeds the threshold value, the image processing apparatus may perform a color conversion process for a grayscale value of a predetermined color space for each pixel, then reduce n pixels which are adjacent to each other to one pixel having an average value of grayscale values of the recording material colors after the color conversion process for the n pixels, and use grayscale values of the recording material colors after the color conversion process as grayscale values of the respective n pixels without performing the reduction to 1/n of the number of pixels for the other colors. In addition, if a grayscale value does not exceed the threshold value, the image processing apparatus may reduce n pixels which are adjacent to each other to one pixel having a grayscale value of the recording material color after the color conversion process for an average value of grayscale values of a predetermined color space of the respective pixels in the pixel block for at least one color, and use grayscale values of the recording material colors after the color conversion process as grayscale values of the respective n pixels without performing the reduction to 1/n of the number of pixels for the other colors.

Thereby, the image processing apparatus according to the embodiment improves a process speed related to the image process and prevents image quality deterioration for a color to be reduced, and maintains image quality of a printing image by maintaining a resolution of image data for colors which are not reduced.

The image processing apparatus according to the embodiment may reduce image data for all the colors of CMYK to 1/n, or may reduce image data to 1/n in the transverse direction. In addition, the image processing apparatus according to the embodiment may reduce image data to ⅓, ¼ or the like of the image data.

Second Embodiment

In the first embodiment, there has been made a description of the process where the image processing apparatus reduces two pixels in the pixel block to one pixel for the pixel block PG1 having two pixels as shown in FIG. 5. On the other hand, in the second embodiment, there will be made of a description of a process where n pixels in a pixel block are reduced to one pixel for the pixel block having pixels exceeding the number (n) of the pixels reduced to one pixel.

For example, for a pixel block PG2 having eight pixels, the printer driver 61 according to the embodiment reduces two pixels in the longitudinal direction in the pixel block PG2 to one pixel. The lower part D of FIG. 5 shows the pixel block PG2 having eight pixels P1 to P8 as an example. In this example, a target pixel SP is assumed to have a position of the pixel P2 in the pixel block PG2.

The printer driver 61 acquires a grayscale value difference between the target pixel P2, and each of the pixels P1 and P3 to P8 for the pixel block PG2. In addition, the printer driver 61 determines whether or not the grayscale value difference of any one of RGB exceeds a threshold value in the grayscale value differences between the target pixel P2 and the respective pixels P1 and P3 to P8 (step S10). However, the invention is not limited to this example, and the printer driver 61 may determine grayscale value differences between pixels of all the combinations in the pixel block.

If the grayscale value difference exceeds the threshold value (YES in step S10), the printer driver 61 performs a color conversion process for each of the pixels in the pixel block PG2 so as to obtain a CMYK value (S11), and reduces two pixels (for example, P1 and P2) adjacent in the pixel block PG2 to one pixel Px having an average value of the CMY values of the two pixels (S12). The pixels P1 and P2 respectively have a K grayscale value in the respective CMYK values. Therefore, in this case, the number of the color conversion processes for the pixel block PG2 is eight.

On the other hand, if the grayscale value difference does not exceed the threshold value (NO in step S11), as shown in the lower part D of FIG. 5, the printer driver 61 calculates an average value of the RGB values R1, R2, and R11 to R16 of eight pixels P1 to P8 in the pixel block PG2 (S13). In this case, the average value of the RGB values R1, R2 and R11 to R16 is assumed as the RGB value R3. In addition, the printer driver 61 obtains a CMYK value C3 by color-converting the average value R3 of the RGB values in the pixel block PG2 (S14).

In addition, as shown in the right part B of FIG. 5 described above, the printer driver 61 reduces two pixels (for example, P1 and P2) adjacent in the pixel block PG2 to one pixel Px having the respective colors c3, m3 and y3 in the CMYK value C3 obtained by color-converting the average RGB value R3 of the pixel block PG2 for CMY other than K (S15). This is same for the other pixels P3 to P8 in the pixel block. In addition, since K is not reduced, the pixels P1 to P8 of K in the pixel block PG2 respectively have a K grayscale value k3 in the CMYK value C3. In this case, the number of the color conversion processes for the pixel block PG2 is one, and the number of the color conversion processes related to the pixel block is smaller than the number (four pixels in the embodiment) of the reduced pixels.

As described above, in a case where the number (for example, eight) of the pixels in the pixel block PG2 is larger than the number n of the pixels reduced to one pixel, if the grayscale value difference does not exceed the threshold value (NO in step S10), the number of color conversion processes is suppressed to (from 1/n to, for example, ⅛) in a case where the number of pixels is n. Specifically, the number of color conversion processes for a pixel block having eight pixels is ¼ of that for a pixel block having two pixels, and thus reduction in the number of color conversion processes is improved. In other words, in a case where a grayscale value difference does not exceed the threshold value, the more the pixels in a pixel block are, the less the number of color conversion processes is, and thus a process speed is improved.

However, on the other hand, the more pixels in a pixel block, the higher possibility that the pixel block includes a pixel where a grayscale value difference with the target pixel SP is equal to or more than a threshold value (YES in step S10). If the grayscale value difference is equal to or more than the threshold value, since the color conversion process is performed for each color in the pixel block (S11), the number of the color conversion processes becomes larger on the contrary. That is to say, as the number of pixels in the pixel block is large, the number of color conversion processes is suppressed in a case where the grayscale value difference does not exceed the threshold value, but possibility of performing the color conversion process for each pixel is heightened in a case of exceeding the threshold value. Therefore, the number of pixels in a pixel block is preferably adjusted depending on attributes of grayscale value differences of image data having a high printing frequency, a desired process speed, image quality, and the like.

What is claimed is:

1. An image processing apparatus which converts first image data having a grayscale value of a predetermined color space for each pixel into second image data having grayscale values of recording material colors of a printing section and having pixels of which number is reduced to 1/n, comprising:

a grayscale value difference determination section that determines whether or not a grayscale value difference between a predetermined target pixel and each of other pixels in a pixel block exceeds a threshold value for each of the pixel blocks having a plurality of adjacent pixels for the first image data; and a color conversion section that performs a color conversion process where the grayscale value of the predetermined color space of the pixel is converted into the grayscale value of the recording material color by referring to a color conversion table, wherein, if the grayscale value difference exceeds the threshold value, the color conversion section performs a first process for the first image data such that the color conversion process is performed for each of the pixels in the pixel block, and then an average value of grayscale values of the recording material colors after the color conversion process for n pixels which are adjacent to each other is used as the second image data, and wherein, if the grayscale value difference does not exceed the threshold value, the color conversion section performs a second process for the first image data such that a grayscale value of the recording material color obtained through the color conversion process for an average value of the grayscale values of the predetermined color space of the respective pixels in the pixel block is used as the second image data.

2. The image processing apparatus according to claim 1, wherein, if the grayscale value difference exceeds the threshold value, the color conversion section performs the first process for at least one of the recording material colors, and does not reduce the number of the pixels to the 1/n and uses grayscale values of the recording material colors after the color conversion process as grayscale values of the respective n pixels for the other colors, and wherein, if the grayscale value difference does not exceed the threshold value, the color conversion section performs the second process for at least one color, and does not reduce the number of the pixels to the 1/n and uses the grayscale values of the recording material colors after the color conversion process as grayscale values of the respective n pixels for the other colors.

3. The image processing apparatus according to claim 2, wherein the recording materials include at least black, and at least one color is a color other than the black.

4. The image processing apparatus according to claim 1, wherein the number of the plurality of pixels included in the pixel block is larger than n.

5. The image processing apparatus according to claim 1, wherein the grayscale value difference determination section determines that the grayscale value difference exceeds the threshold value if a grayscale value difference of at least one component of components of the predetermined color space exceeds the threshold value.

* * * * *